United States Patent [19]
Hassell

[11] 3,977,717
[45] Aug. 31, 1976

[54] LOG BUNK WITH REMOVABLE, NON-TRIP STAKES

[76] Inventor: Dennis Ray Hassell, 250 Dead Indian Road, P.O. Box 219, Ashland, Oreg. 97520

[22] Filed: Mar. 17, 1975

[21] Appl. No.: 559,089

[52] U.S. Cl. .............................. 296/43; 105/384; 280/147
[51] Int. Cl.² ......................................... B60P 7/06
[58] Field of Search .............. 296/43; 280/143, 147; 105/380, 382, 384

[56] References Cited
UNITED STATES PATENTS

| | | | |
|---|---|---|---|
| 234,507 | 11/1880 | Waitt | 296/43 X |
| 343,837 | 6/1886 | McNees | 280/147 |
| 382,963 | 5/1888 | Fowler | 296/43 X |
| 1,413,540 | 4/1922 | Overson | 105/384 |
| 1,454,037 | 5/1923 | Byrne | 280/143 X |
| 2,127,480 | 8/1938 | Fitch | 296/43 X |
| 2,893,330 | 7/1959 | Johnson | 280/143 X |
| 3,674,304 | 7/1972 | Swanson | 296/43 |

*Primary Examiner*—L. J. Paperner
*Assistant Examiner*—Winston H. Douglas
*Attorney, Agent, or Firm*—Eugene D. Farley

[57] ABSTRACT

A log bunk with removable, non-trip stakes for use in logging vehicles has a rugged, easily installed interlock system to maintain the stake orientation relative to the bunk when in use. The invention utilizes a locating pin and integral structural elements in order to align and maintain the stakes on the bunk.

2 Claims, 6 Drawing Figures

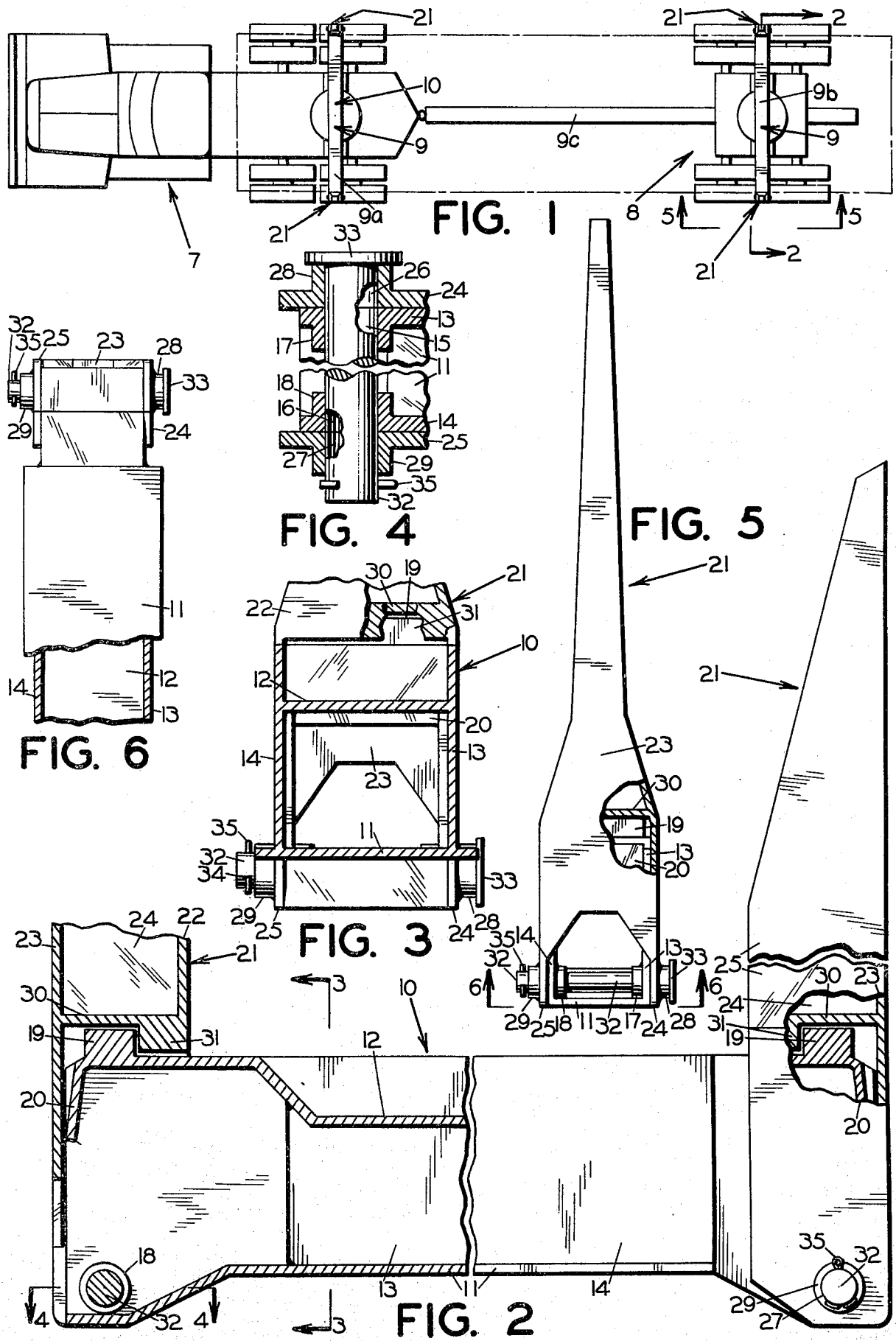

LOG BUNK WITH REMOVABLE, NON-TRIP STAKES

BACKGROUND OF THE INVENTION

This invention relates to log bunks of the class used for retaining logs on logging vehicles. It is primarily intended for use on log trucks, however it may be adapted for use on railraod cars or other means of log conveyance.

Vehicles employed in transporting logs are provided with two or more bunks extending transversely of the vehicle at spaced intervals and provided at their ends with stakes for retaining the loaded logs. With the advent of large scale, portable, mechanical unloaders at most large log receiving facilities it is common for log bunk stakes to be joined rigidly to the respective bunks, forming a non-trip, integral unit. The use of non-trip stakes has been found to be particularly advantageous since they provide insurance against accidental unloading in transit, and hence greater safety. Also, they are of a lower initial cost than trip type stakes.

However, conventional non-trip stakes generally are not removable from the bunk body, or are removable only at the cost of significant added time and expense. Since the stakes become damaged from time to time due to their necessarily rough usage, removal and replacement of the stakes become necessary many times during the life of the vehicle.

Also, in many types of logging operations it is desirable to use several sizes of stakes, depending upon the particular type or size of logs to be transported. In addition, when transporting certain classes of small diameter logs, the stakes employed commonly are quite long. When long stakes are used on a truck having a detachable trailer which is returned to the log-loading site empty in a piggy-back manner, they often create excessive clearance problems, particularly on the back roads frequented by logging vehicles. Long stakes also often times will not allow passage of the vehicle into low bay service areas.

Removable stakes have been used in the past in many types of non-logging vehicles. The normal configuration is to provide a pocket in the truck bed into which the stake can be inserted. In many types of utility vehicles this type of removable stake has proven quite satisfactorily.

However, the pocket mounted stake is not properly functionable in logging vehicles. Firstly, the basic design is not intended for long stakes carrying heavy loads. Secondly, due to the necessarily loose fit, they lack the requisite stability for log transportation which is constantly subject to shifting. Lastly, the pockets tend to become clogged with dirt and bark in logging use.

Accordingly, the general object of the present invention is to provide a log bunk having easily removable stakes, but which is of sufficient strength to withstand the rigorous use imposed by the transport of logs.

It is a further object of the present invention to provide a log bunk wherein the stakes are secured to the bunk body by locking means integral to the device and not a part of the joinder elements.

It is a further object of this present invention to provide a log bunk having stake joinder means that will not be rendered non-working from accumulation of bark and dirt.

It is a further object of the present invention to provide such stakes which are self indexing for ease of installation and yet simple of design, manufacture and maintenance.

It is a further object of the present invention to provide stakes which are stable in use and will not become dislodged when unloaded.

THE DRAWINGS

The manner in which the foregoing and other objects of the invention are accomplished will be apparent from the accompanying specificaton and claims considered together with the drawings wherein:

FIG. 1 is a plan view of a log truck showing the installation of my log bunks thereon.

FIG. 2 is a fragmentary side elevation, foreshortened and partially broken away, of the log bunks taken along line 2—2 of FIG. 1.

FIG. 3 is a fragmented sectional end view of the bunk taken along line 3—3 of FIG. 2.

FIG. 4 is a fragmented sectional view showing the details of the joinder means of the stakes taken on lines 4—4 of FIG. 2.

FIG. 5 is an end view, partially broken away, of the stake looking in the direction of the arrows of line 5—5 of FIG. 1.

FIG. 6 is a fragmentary bottom view, partially broken away, of the stake of FIG. 5 looking in the direction of the arrows of line 6—6 of that figure.

GENERAL STATEMENT OF THE INVENTION

My invention provides novel, easily removable stakes for use on non-trip type log bunks commonly employed on logging vehicles.

A plurality of transversely oriented bunks are positioned at spaced intervals along the length of a logging vehicle in the common manner. Each bunk includes a channelled frame with longitudinal, elongate, raised frame abutment block means on the upper surface and opposed, stake locating means on the lower outer portion of the side plate at each end of the bunk.

Two generally rectangular, elongate, vertical stakes are position on each bunk, one on each of the extremities thereof. The side plates of the stakes extend downwardly to fit outwardly the adjacent sides of the bunk. Similar pin locating means are provided on the side plate of each stake so that, when installed upon the bunk, the locating means all are coaxially aligned, allowing insertion of a pin to fix the two elements releasably together. The lower portions of the stakes contain a horizontal medial plate having depending therefrom stake abutment block means which fit inwardly adjacent the similarly figured frame abutment block means.

DETAILED DESCRIPTION OF A PREFERRED EMBODIMENT

As shown in FIG. 1, the present invention is generally utilized on a log truck comprising tractor 7, and trailer 8. Each normally carries a log bunk 9 of the present invention. Forward log bunk 9a is mounted on the rear of the tractor and rearward log bunk 9b is mounted on the trailer above its axle. Trailer 8 is joined to tractor 7 by horizontal tongue 9c. The logs are supported by the bunks within the area shown by the dashed lines. When empty it is common to remove the trailer and transport in a piggy-back manner behind the tractor with the tongue extending over the tractor.

In FIG. 2, the log bunk of the present invention is shown with the lower portion of the left-hand stake and the supporting portion of the bunk body adjacent thereto broken away to illustrate the interconnecting parts. The bunk itself comprises a frame 10 which is of a length substantially equal to the width of the vehicle. It is provided with pivotable mounting means (not shown) for attachment to the vehicle as is commonly employed in the industry. On trucks, two such bunks customarily are provided, one located on the tractor and one located at the rear of the trailer.

Frame 10 generally provides a channel type framework which includes base plate 11, top plate 12, and opposed side plates 13, 14 all extending substantially the whole length of frame 10. Base plate 11 and top plate 12 angle upwardly and downwardly, respectively, a short distance from each extremity, then continue outwardly providing a greater frame height at their end portion. Side plates 13 and 14 extend on their lower edges from base plate 11 upwardly to a height equal that of the raised extremity of top plate 12.

The lower portions of the outer extremities of side plates 13 and 14 contain pin holes 15, 16. Adjacent side plates 13, 14 and attached thereto are inwardly extending frame pin locating means 17, 18 which are positioned coaxially with pin holes 15, 16 respectively.

The outer extremity of top plate 12 has joined to its upper surface frame abutment block means 19, which serves to fix the stakes of my invention. Immediately outwardly of frame abutment block means 19 top plate 12 angles acutely downwardly to provide index tabs 20. The various elements of frame 10 can be joined to their adjacent elements by any suitable means and are shown as being welded in the preferred embodiment.

Stakes 21, shown in FIG. 5, are releasable mounted one at each end of the bunk frame and are again generally of a channel type framework construction. Thus each comprises a front plate 22, a back plate 23 and side plates 24, 25.

The stake side plates are of a substantial height, depending on the character of the particular load to be carried. They overlie the outer extremities of bunk side plates 13, 14. When the stakes are installed on the bunk frame, the lower portion of stake side plates 24, 25 are positioned immediately outwardly adjacent bunk side plates 13, 14. Stake side plates 24, 25 contain holes 26, 27 in their lower extremities and have joined outwardly adjacent thereto stake pin locating means 28, 29.

Stake back plate 23 has a length substantially the same as the length of the side plates. However, its center portion is relieved at the lower end, exposing pin locating means 17, 18 for easy access.

Stake front plate 22 is of a restricted length, with its lower edge extending to approximately the upper edge of bunk frame 10 when the stake is installed on the bunk.

Medial plate 30 fits horizontally within the stake at the lower end of front plate 22 and thus when the stake is installed on the bunk lies adjacent frame abutment block means 19. The inner portion of medial plate 30 has joined to its lower surface stake abutment block means 31 which is offset inwardly of frame abutment block means 19.

As shown in FIGS. 3 and 4, pin 32 is of a diameter to fit through pin locating means 17, 18, 28 and 29. It is joined on one end to head 33 of a slightly larger diameter and contains hole 34 on the other end to carry cotter pin 35. Since pin 32 carries a substantial portion of the stake load it is fabricated of a material sufficiently hard to prevent wear or breakage.

OPERATION

The operation of the bunk assembly herein described is readily apparent from the foregoing and from the accompanying drawings. To install the stakes on the bunk, they are positioned according to the above specification with stake side plates 24 and 25 fitted over bunk side plates 13 and 14. Pin 32 is inserted through aligned pin locating means 17, 18, 28 and 29 and cotter pin 35 installed in hole 34. Index tab 20 aids in alignment during installation, but is angularly positioned so as to allow slight movement, or dirt accumulation during use without binding on the stake.

When the bunk is loaded, stakes 21 are restrained laterally by pin 32 at the lower end and medially by frame abutment block means 19 inter-engaging stake abutment block means 31. In addition, as is particularly shown in FIG. 2, the specific arrangement of the abutment block means is such that the stake will not rotate about pin 32 even in the event pin locating means 17, 18, 28 and 29 become quite loose with wear. Removal of the stakes for replacement, repair or during transportation of a trailer is quite easily accomplished. Once pin 32 is removed the stake can be simply lifted off the bunk frame for storage or repair and a new stake can be reinstalled if required.

It is to be understood that the form of my invention herein shown and described is to be taken as a preferred example of the same and that various changes in the shape, size and arrangement of parts may be resorted to without departing from the spirit of my invention.

Having thus described my invention I claim:

1. A log bunk comprising:
   a. a frame adapted for mounting transversely of a vehicle, the opposite end portions of the frame each having a pair of longitudinally spaced side plates and a top plate,
   b. a pair of elongated non-trip stakes, one for each of said opposite end portions of the frame, the lower portion of each stake including a pair of spaced side plates and a medial plate, said lower portion being open at its front and bottom sides, whereby to interfit removably with its associated end portion of the frame with the side plates of the frame and stake disposed adjacent each other and the medial plate of the stake overlying the top plate of the frame,
   c. a readily removable pin extending through registering openings in the side plates of the frame and stake when the frame and stake are in said interfitted arrangement whereby the removal of the stake from the frame requires the removal of the pin, and
   d. interengageable abutments on each top plate and medial plate securing the stake against laterally outward pivotal movement about the axis of its associated pin when the pin interconnects said side plates.

2. The log bunk of claim 1 wherein the lower portion of each stake also includes a back plate and the associated end of the frame includes an index tab extending angularly outward and downward from the top plate of each end portion of the frame.

* * * * *